UNITED STATES PATENT OFFICE.

RUDOLF REYHER, OF ELBERFELD, GERMANY, ASSIGNOR TO THE FARBENFABRIKEN, VORMALS FR. BAYER & CO., OF SAME PLACE.

AZIN DYE AND PROCESS OF MAKING SAME.

SPECIFICATION forming part of Letters Patent No. 543,894, dated August 6, 1895.

Application filed April 20, 1895. Serial No. 546,553. (No model.)

*To all whom it may concern:*

Be it known that I, RUDOLF REYHER, chemist, doctor of philosophy, a subject of the Emperor of Russia, (assignor to the FARBENFABRIKEN, VORMALS FR. BAYER & CO., of Elberfeld, Prussia, Germany,) residing at Elberfeld, Prussia, Germany, have invented a new and useful Improvement in the Manufacture of Azin Dyes; and I declare the following to be an exact and clear description of my invention.

My invention relates to the production of azin dyes, obtainable from condensing nitrosodimethylanilinhydrochlorid (or nitrosodiethylanilinhydrochlorid) with phenyl-metatoluylenediamin (or paratolylmetatoluylenediamin), valuable violet-red azin dyes being produced in this manner, which are distinguished by their brilliancy and fastness on washing and exposure to light.

The aforesaid phenylmetatoluylenediamin (or paratolylmetatoluylenediamin) can be obtained according to the following method: A mixture of one part, by weight, of metatoluylenediamin chlorhydrate (or the corresponding quantity of another salt of metatoluylenediamin) with four parts, by weight, of anilin is heated during about twenty hours at from 250° to 270° centigrade in a vessel capable of withstanding pressure. An excess of soda-lye having been added, the unaltered anilin is then distilled over by means of steam. The remaining oil is separated while hot from the alkaline solution and is boiled with water, in order to remove unaltered metatoluylenediamin, if any be present. The oil thus obtained is mixed with a slight excess of muriatic acid and a large quantity of water, and the mixture is boiled until it is apparent that no more of the oily mass will dissolve. The residue having been separated by filtration, a filtrate is obtained containing merely the hydrochlorid of phenylmetatoluylenediamin, which, owing to its slight solubility in cold water, separates in the form of brilliant scales or flat needles as the liquid cools. In order to obtain the base the hot solution in water of the said phenylmetatoluylenediamin hydrochlorid is mixed with a small quantity of muriatic acid, digested with animal charcoal, and after filtration the filtrate is mixed with ammonia-liquor. The phenylmetatoluylenediamin is precipitated as a light oil, which crystallizes after a time. The base can be purified by crystallization from ligroin and forms in a pure state star-shaped groups of snow-white prismatic crystals, melting at from 69° to 70° centigrade, having the formula:

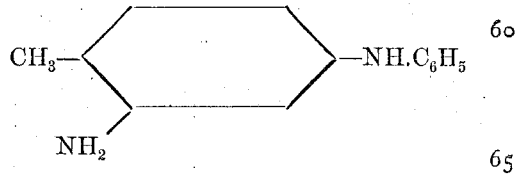

The process takes place in an analogous manner if in the foregoing example a corresponding quantity of paratoluidin (or other homologous thereof) is used in place of anilin. Of course the method for obtaining the aforesaid phenylmetatoluylenediamin can be varied, viz: Instead of heating salts of metatoluylenediamin with free primary amin the free metatoluylenediamin can be heated with salts of primary amin. Such variations, however, are known to every experienced chemist and need not be further illustrated.

According to my researches the above phenylmetatoluylenediamin (or paratolylmetatoluylenediamin) may be easily condensed with nitroso derivatives of tertiary aromatic amin, or generally with all substances whose behavior is known to be analogous to that of these nitroso compounds—such as dialkylated amidoazobenzene or the like.

In carrying out my invention practically I can, for example, proceed as follows: 19.8 parts, by weight, of phenylmetatoluylenediamin are dissolved in ninety parts, by weight, of alcohol and twenty-eight parts, by weight, of nitrosodimethylanilinhydrochlorid are gradually added to the cold solution. The reaction mixture, which becomes warm spontaneously, is stirred until the nitroso compound is no longer distinguishable and the solution has assumed a deep-blue color. The liquid is then heated in a vessel provided with a reflex condenser until it acquires a pure bright-red color. As the mixture cools the dye separates in crystals, for the most part, which are isolated by filtration, washing with alcohol, and drying. Another method for isolating the dye consists in distilling off the alcohol, mixing the residue with hot water, and mixing then the liquid with a solution of common salt. On cooling the dye-stuff separates in small scales, which are filtered off, pressed, and dried. The dye-stuff forms, when pulverized, a greenish-black powder with metallic luster, readily soluble in water with a violet-red color; in alcohol with a bluish-red color. By concentrated sulfuric acid (66° Baumé) it is dissolved with a green color, which turns into blue on the addition of a small quantity of ice-water to the sulfuric-acid solution. If a very large quantity of water is added to the aforesaid sulfuric-acid solution the green solution turns into violet-red. If the solution of the dye-stuff in water is mixed with soda-lye red flakes separate from the watery solution. The dye-stuff produces on cotton mordanted with tannin brilliant violet-red shades of great fastness to the action of alkali and light. The coloring-matter thus produced has probably the following formula:

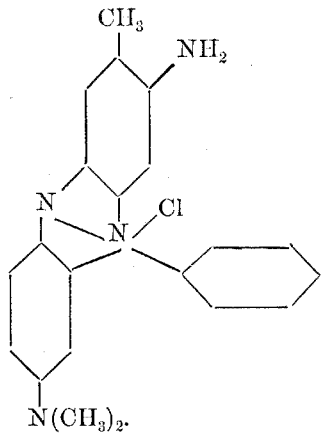

Analogous dye-stuffs are obtained if in the foregoing example the nitrosodimethylanilin is replaced by nitrosodiethylanilin, or if paratolylmetatoluylenediamin is condensed with salts of nitrosodimethylanilin or nitrosodiethylanilin. The dyes thus obtained yield in general shades somewhat more bluish-red than those produced by the dye defined in the example. The said dyes are equally included in the present invention.

Having now described my invention and in what manner the same is to be performed, what I claim as new, and desire to secure by Letters Patent, is—

1. The process for the production of azin-dyes, which process consists in condensing salts of nitrosodialkylanilin with phenylmetatoluylenediamin in the manner hereinbefore described.

2. As new articles of manufacture the azin-dyes obtainable from condensing salts of nitrosodimethylanilin with phenylmetatoluylenediamin having in case nitrosodimethylanilin and phenylmetatoluylenediamin are used probably the following formula:

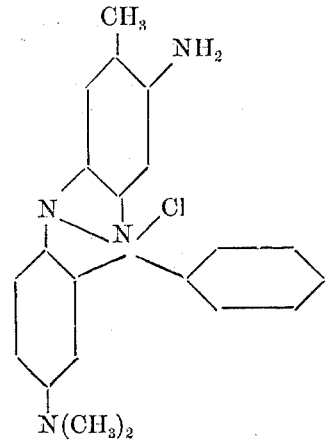

forming a greenish-black powder with metallic luster, easily soluble in water with a violet-red color, in alcohol with a bluish-red color, insoluble in soda-lye, soluble in concentrated sulfuric acid (66° Baumé) with a green color, which turns first into blue on the addition of a small quantity of ice-water to the sulfuric-acid solution and finally into violet-red on the addition of a very large quantity of water producing on cotton mordanted with tannin brilliant violet-red shades of great fastness to the action of alkali and light.

In testimony whereof I have signed my name in the presence of two subscribing witnesses.

RUDOLF REYHER.

Witnesses:
F. H. STRAUSS,
A. STRAUSS.